Aug. 20, 1968     W. R. WALKER     3,397,431
TUBE CLAMP ASSEMBLY
Original Filed Jan. 12, 1965     2 Sheets-Sheet 1
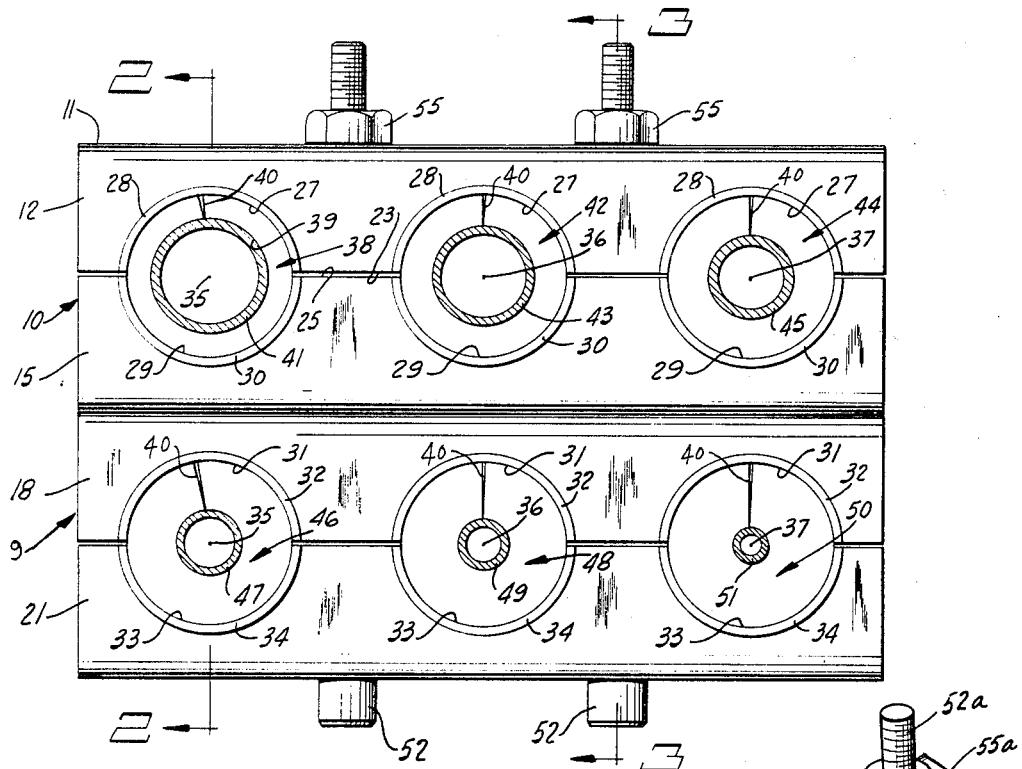
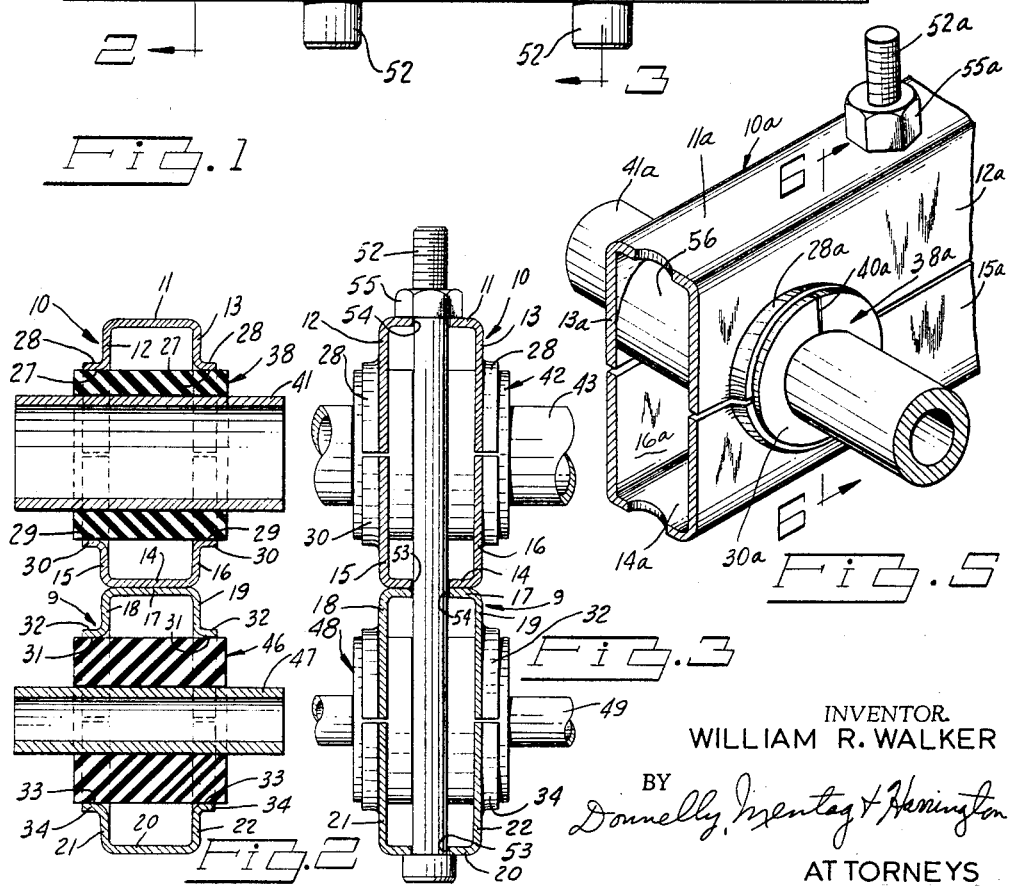
INVENTOR.
WILLIAM R. WALKER

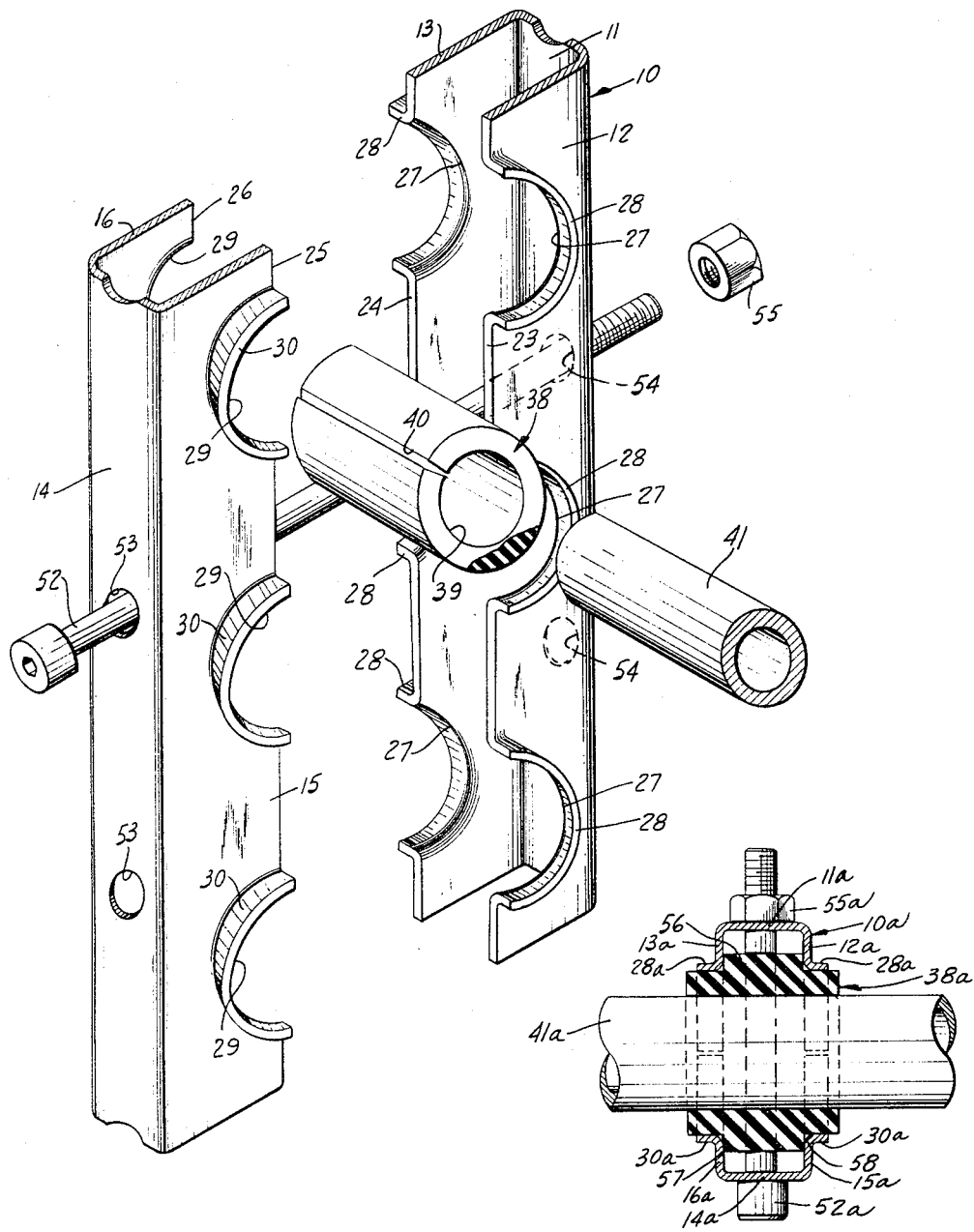

United States Patent Office 3,397,431
Patented Aug. 20, 1968

3,397,431
TUBE CLAMP ASSEMBLY
William R. Walker, Warren, Mich., assignor to Hydro-Craft Inc., Detroit, Mich., a corporation of Michigan
Continuation of application Ser. No. 425,014, Jan. 12, 1965. This application May 12, 1967, Ser. No. 639,591
7 Claims. (Cl. 24—125)

This application is a continuation of application Ser. No. 425,014 filed Jan. 12, 1965, and now abandoned.

This invention relates generally to the tube clamp art, and more particularly, to a multiple tube clamping assembly adapted to support a plurality of tubes or similar items in rigid fixed positions.

It is well known in the tube clamp art to employ various means for retaining a plurality of tubes, or the like, in fixed positions. For example, a block of metal in which holes have been drilled, or a die cast block which has holes formed therein and which has been split and the tubes disposed in the holes and clamped therein by securing the split portions of the die cast block together. A disadvantage of the aforemetioned prior art clamps is that the spacing of the tube holes is not equal. This unequal spacing of the tube holes is a disadvantage because it is easier for a workman to install the necessary hydraulic tubing and fittings for hydraulic tanks and machines when the hole spacings are equal. When the tube holes ore not equally spaced, it also means that the workman using such prior art clamping means must work with fractional dimensions and this is another disadvantage. Still another disadvantage of the prior art tube clamping devices is that the die cast metal is heavy and cannot be welded to machines or tanks upon which the clamps are to be mounted, which means that time consuming drilling and tapping operations must be accomplished, and a base provided for mounting the clamp on the machine, tank, or the like. A further disadvantage of the prior art tube clamping devices is the fact that they are limited to a clamp length equal to the die which forms the die cast clamp. A further disadvantage of the prior art tube clamps is that, if the aforementioned die cast clamps are not available, the workman must fabricate some sort of a tube bracket on the job, which calls for various machine operations such as drilling, sawing and the like.

In view of the foregoing, it is an important object of the present invention to provide a novel and improved multiple clamping apparatus which is economical of manufacture, compact in construction, light in weight and efficient in operation.

It is another object of the present invenion to provide a novel and improved multiple clamp assembly which is adapted to hold a plurality of tubes or the like in fixed positions, and in evenly spaced apart positions, to facilitate connection of the tubes with axially disposed tubes by means of suitable fittings.

It is a further object of the present invention to provide a novel and improved multiple clamp assembly which may be made in various lengths, or which can be quickly and easily cut to any desired length on the job, and which can be welded to a tank, machine or the like in a quick and easy manner.

It is still another object of the present invention to provide a novel and improved multiple clamp assembly which comprises a pair of stamped members having a substantially U-shaped cross section with half-round holes formed by a stamping process along the edges of the walls of the U-shape, and which two stamped members may be quickly and easily assembled to rigidly secure a plurality of tubes in place. The clamp assembly includes a resilient split grommet having holes smaller in diameter than the diameter of the tube, and which surrounds the tubes passing through the clamp assembly, and assists in clamping the tubes in place and protecting the tubes against vibration, and wherein the tube holes in the grommets may be varied to permit the selective clamping of various size tubes in the same clamp assembly.

Other objects, features and advantages of this invention will be apparent from the following detailed description, appended claims, and the accompanying drawings.

In the drawings:

FIG. 1 is a side elevational view of a multiple clamp assembly made in accordance with the principles of the present invention;

FIG. 2 is an elevational sectional view of the structure illustrated in FIG. 1, taken along the line 2—2 thereof, and looking in the direction of the arrows;

FIG. 3 is an elevational, sectional view of the structure illustrated in FIG. 1, taken along the line 3—3 thereof, and looking in the direction of the arrows;

FIG. 4 is an elevational perspective view of a portion of the multiple clamp assembly of FIG. 1, and showing the parts separated to illustrate the structure of the clamp assembly;

FIG. 5 is a fragmentary perspective view of a second embodiment of the invention; and FIG. 6 is an elevational, sectional view of the structure illustrated in FIG. 5, taken along the line 6—6 thereof, and looking in the direction of the arrows.

Referring now to the drawings, and in particular to FIGS. 1 through 4, the numerals 9 and 10 generally indicate two sections of a multiple clamp assembly made in accordance with the principles of the present invention. Each of the clamp sections 9 and 10 is made from a pair of U-shaped channel bars which are disposed with the open ends thereof adjacent each other so as to form a substantially rectangular, elongated tubular member.

As best seen in FIGS. 1, 2 and 3, the upper clamp section 10 includes an upper channel bar which comprises the top end wall 11 that forms the bight portion of the channel bar and the integral side walls 12 and 13. The lower channel bar of the upper clamp section is similarly formed and includes the bottom end wall 14 and the integral spaced apart side walls 15 and 16.

The lower clamp section 9 includes an upper channel bar which comprises the top end wall 17 that forms the bight portion of the channel bar and the integral side walls 18 and 19. The lower channel bar of the lower clamp section is formed similarly and includes the bottom end wall 20 and the integral spaced apart side walls 20 and 21.

As shown in FIG. 4 the lower edge of the upper channel bar side walls 12 and 13 are parallel and are indicated by the numerals 23 and 24. The upper edges of the mating channel bar side walls 15 and 16 are indicated by the numerals 25 and 26. As best seen in FIG. 4, the channel side walls 12 and 13 are each provided along the lower ends thereof with a plurality of longitudinally spaced apart inwardly extended semi-circular or half round holes 27. The semi-circular holes 27 have extended perpendicularly outward therefrom semi-circular flanges or clamp seats 28. The side walls 15 and 16 on the lower channel bar of the upper clamp section are also provided with similar semi-circular holes 29 which are bounded by the perpendicular outwardly extended semi-circular flanges 30. The flanges 30 from seats for clamping the grommet members 38 in place, more fully described hereinafter.

As shown in FIGS. 1 and 2, the upper channel bar of the lower clamp section 9 is similarly provided with a plurality of semi-circular holes along the lower side thereof in spaced apart positions as indicated by the numerals 31, and they are bounded by similar perpendicular outwardly extended flanges 32.

The lower channel bar of the lower clamp section 9 is similarly provided with semi-circular holes 33 and the perpendicular flanges 34. In FIG. 1 the numerals 35, 36, and 37 indicate the center lines of the circular clamping holes or seats formed by the flanges and the last described semi-circular holes in the two-clamp sections.

As shown in FIGS. 1 through 4, a tubular grommet 38 is adapted to be mounted in each of the transverse clamping seats formed by a set of four of the last-described semi-circular holes and flanges. The grommets 38 are made from any suitable oil-resistant resilient material, as for example "Neoprene" rubber or the like. These grommets assist in reducing vibration or shock to the tubes held in the clamp means. The durometer rating of these grommets should be sufficient to maintain the position of the tubes held within the clamp means and yet reduce vibration as much as possible. A preferable durometer number is 80. The numeral 39 indicates the longitudinal hole formed through the grommet 38. The grommet 38 is provided with a longitudinal split or slot indicated by the numeral 40 to permit the grommet to be squeezed and to grip a tube 41 in a firm and rigid clamping engagement. As shown in FIG. 4 the large internal surface areas of the flanges 28 and 30 provide a large surface area for engaging and squeezing the grommet without cutting the grommet. It will be understood that the grommets may also be made from any suitable synthetic material.

As shown in FIG. 1 the grommet 38 is provided with a first size hole 39 while the other grommets 42 and 44 are provided with successively smaller holes therethrough for clamping therein successively smaller sizes tubes 43 and 45. The grommets 42 and 44 are also provided with slots 40.

As shown in FIGS. 1, 2 and 3 the lower clamp section 9 is also provided with a plurality of grommets 46, 48, and 50 for clamping in place the various sized tubes 47, 49, and 51 in the same manner as the upper clamp section 10.

The clamp sections 9 and 10 are shown in FIGS. 1, 2 and 3 as being secured together by a plurality of elongated bolts 52 which pass through the holes 53 in the lower channel bar walls 20 and 14 and the holes 54 in the upper channel walls 17 and 11. Each of the bolts 52 is provided with a locking nut 55. It will be understood that if it is desired to secured more than two clamp sections together in accordance with the particular job involved that the bolts 52 may be longer in order to secure together any desired number of clamping sections.

A slightly modified species of the invention is shown in FIGS. 5 and 6. The parts of the embodiment of FIGS. 5 and 6 which are the same as the first-described embodiment are marked with the same reference numerals followed by the small letter "a." As is best seen in FIG. 6, the second embodiment includes a slightly modified grommet 38a which is provided with a peripherally disposed, outwardly extended locating rib 56 which is provided with the shoulders or radial walls, or radial surfaces 57 and 58 on the opposite sides thereof. The advantage of the structure of the second embodiment is that the rib or the shoulder 56 is easier to assemble in place in the clamping sections since it fits inside of the side walls of the respective channel bar members, and it assists in mating the channel bar parts together when assembling a plurality of clamp sections. The shoulder or rib 56 thus provides a self-aligning function or characteristic to the embodiment of FIGS. 5 and 6.

It will be seen that all of the semi-circular holes in the various channel bar portions are evenly spaced to provide evenly spaced tube clamping holes. For example the holes are preferably spaced about one and one-half inches apart. Experience has shown that it is best to keep an even spacing between the tubes so that the workman can quickly and easily assemble a plurality of conventional fittings on the tubings which are necessary when setting up a hydraulic system. When the tubes are evenly spaced apart it is easy for the men to use the standard parts as unions, couplings, and the like. Experience has also shown that the channel bars which form the clamping sections may be made to any desired length and then cut to the desired job length when assembling the clamp sections in place. This is an advantage because the workman sometimes does not know until he gets on a job exactly how many tubes are going to be necessary to complete a job. The clamp channel bars are also preferably made from soft rolled steel whereby they can be quickly and easily welded to the equipment to which the tubes are being assembled without wasting time drilling holes through an expensive stamping.

It will be seen that by providing grommets with various sized internal holes, that any number of different sized tubes can be clamped in the same clamp section in a quick and easy manner. It will be understood that the clamp means of the present invention can be used for clamping many types of tubes in place, as for example hydraulic tubing, electrical conduits, and the like. These tubes run from a maximum diameter of approximately ⅝" down to a minimum of about ¼". All the tubes in this range can be easily accommodated in the clamp means of the present invention. The slot 41 in the grommet permits the clamp means to be mounted on any system that is already piped and assembled and which needs additional clamps. The provision of the evenly-spaced centers of the mounting or clamping holes permits the installer to easily figure from the center line of one tube to another without going into odd dimensions and fractions. The evenly-spaced centers also permit the stacking of tubes in layers which simplifies installations. The tubular construction of the channel bars provides a clamp which is lighter in weight than any of the prior art clamps.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:
1. In a clamp assembly, the combination comprising:
 (a) a pair of aligned U-shaped elongated members disposed with one member inverted and on top of the other;
 (b) each of said U-shaped members having a pair of spaced apart side walls;
 (c) each of said side walls of each U-shaped member being provided with a plurality of longitudinally spaced apart, semi-circular holes along the free edges thereof;
 (d) the semi-circular holes in the one U-shaped member being aligned with the semi-circular holes in the other U-shaped member to form a plurality of pairs of transversely spaced circular holes;
 (e) a tubular grommet seated in each of the circular holes and extended transversely of the U-shaped members;
 (f) means for securing the clamping members together; and,
 (g) each of the semi-circular holes in the U-shaped members having a laterally extending grommet engaging flange thereabout dimensioned so that the ends of the grommets will be compressed thereby against associated tubes when the clamping members are secured together.
2. The clamp assembly as defined in claim 1, wherein:
 (a) each of the tubular grommets is provided with a longitudinally extended slot through the sidewalls thereof.
3. The clamp assembly as defined in claim 1, wherein:
 (a) each of the tubular grommets is provided with a peripherally disposed, radially extended shoulder adapted to be seated between the side walls of the U-shaped elongated members.

4. The clamp assembly as defined in claim 1, wherein:
(a) at least some of the grommets are each provided with a different sized hole therethrough.

5. The clamp assembly as defined in claim 1, wherein:
(a) the semi-circular holes in the U-shaped elongated members are evenly spaced apart from each other.

6. The clamp assembly as defined in claim 1, including:
(a) at least a second pair of U-shaped elongated members; and,
(b) means for securing the pairs of U-shaped elongated members together.

7. The clamp assembly as defined in claim 1, wherein:
(a) at least some of the grommets are each provided with a different sized hole therethrough; and,
(b) the semi-circular holes in the U-shaped elongated members are evenly spaced apart from each other.

References Cited

UNITED STATES PATENTS

| | | | |
|---|---|---|---|
| 770,278 | 9/1904 | Fletcher | 248—68 |
| 1,761,075 | 6/1930 | Gest | 138—112 |
| 2,227,528 | 1/1941 | Adler | 174—135 |
| 2,404,531 | 7/1946 | Robertson | 248—68 |
| 2,451,699 | 10/1948 | Twaroski | 248—68 XR |
| 3,005,609 | 10/1961 | Jaffe. | |
| 3,161,721 | 12/1964 | Torr | 174—155 |
| 2,425,935 | 8/1947 | Hayman | 248—68 XR |
| 3,216,683 | 11/1965 | Girard | 248—68 |

FOREIGN PATENTS 538,730  8/1941  Great Britain.

DONALD A. GRIFFIN, *Primary Examiner.*